Oct. 29, 1929.  C. R. SPALDING  1,733,916
COMBINED TRUNK AND BED
Filed Nov. 19, 1926   3 Sheets-Sheet 1
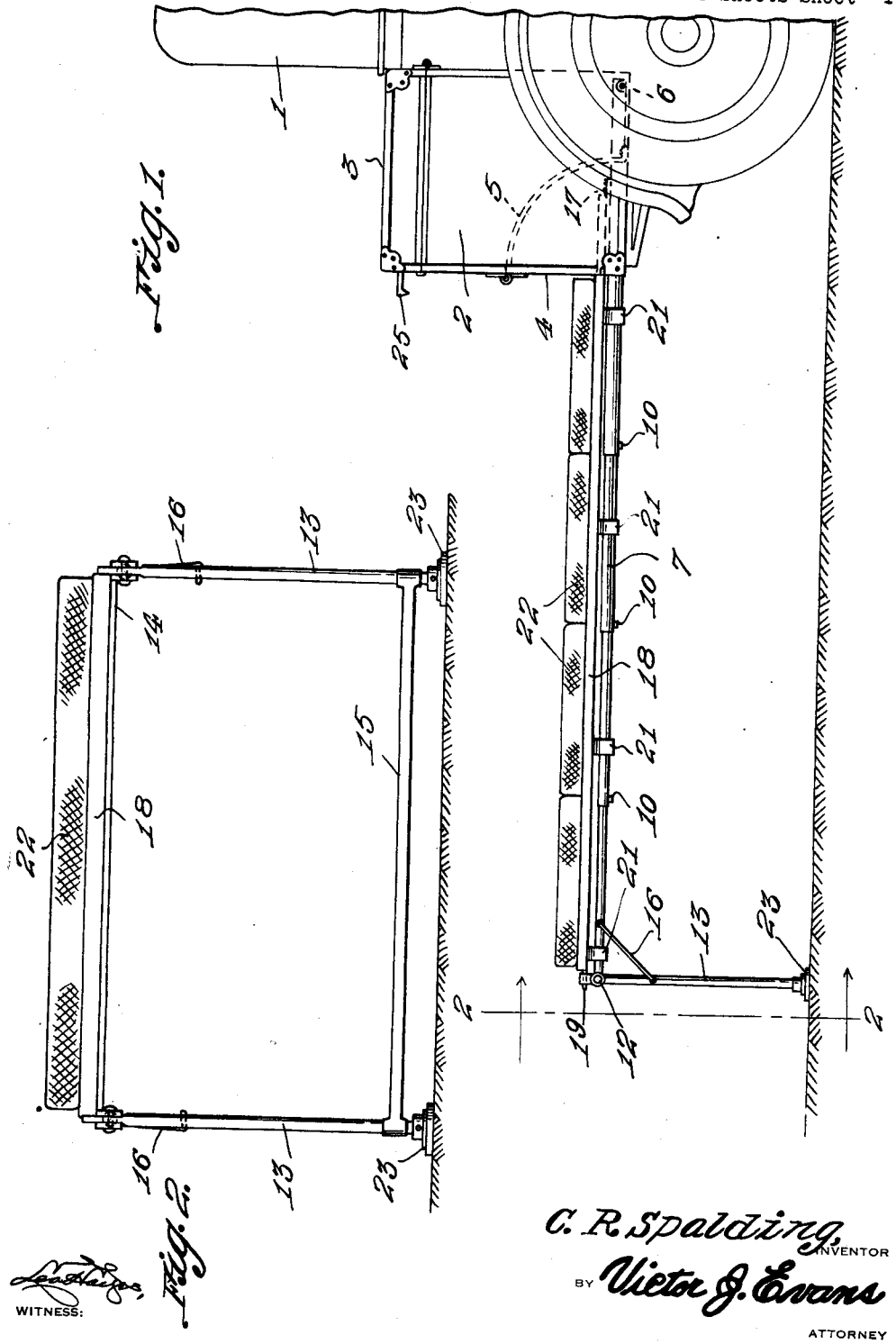

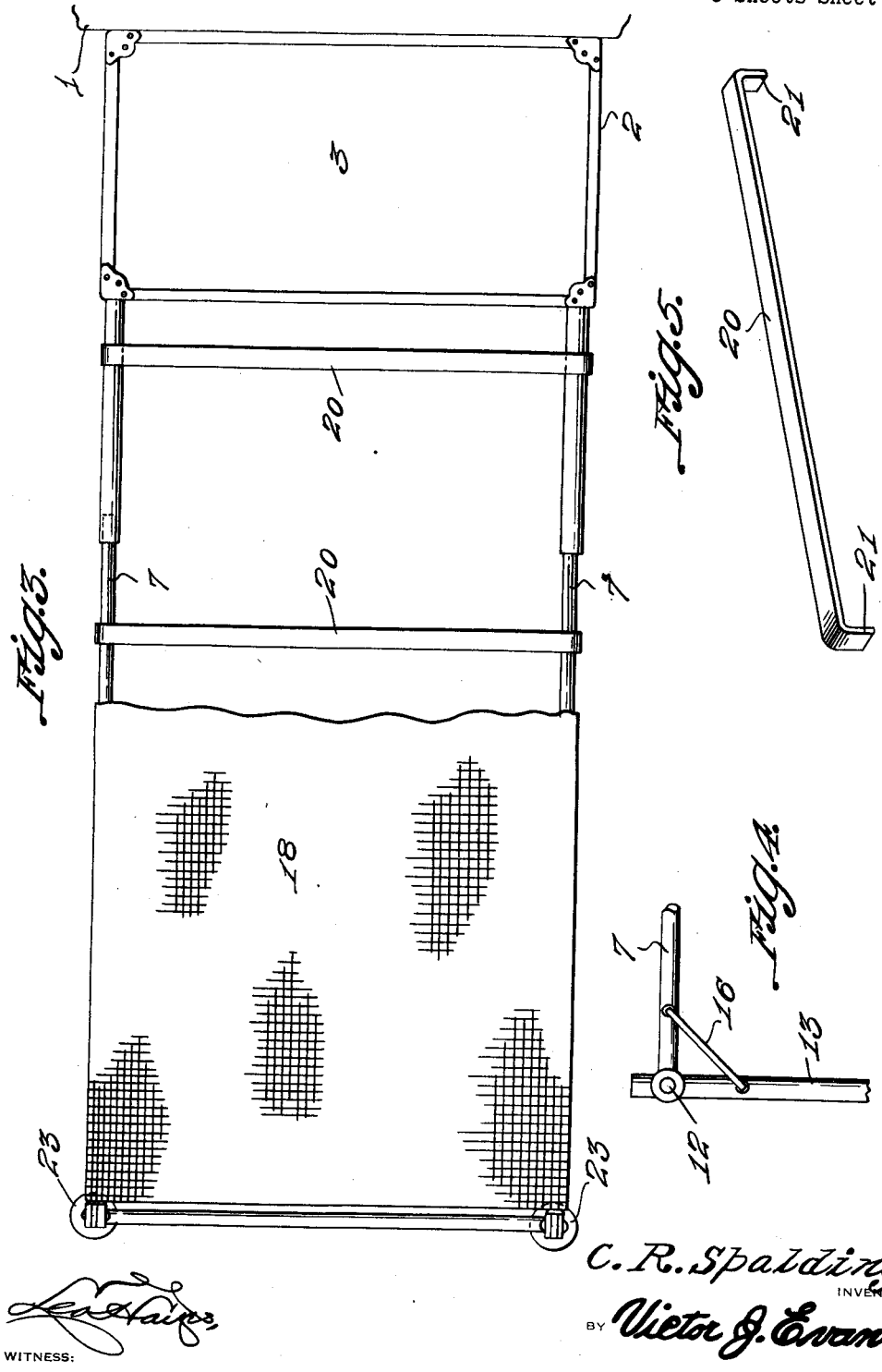

Oct. 29, 1929.　　　　C. R. SPALDING　　　　1,733,916
COMBINED TRUNK AND BED
Filed Nov. 19, 1926　　　3 Sheets-Sheet 3
Fig. 6.
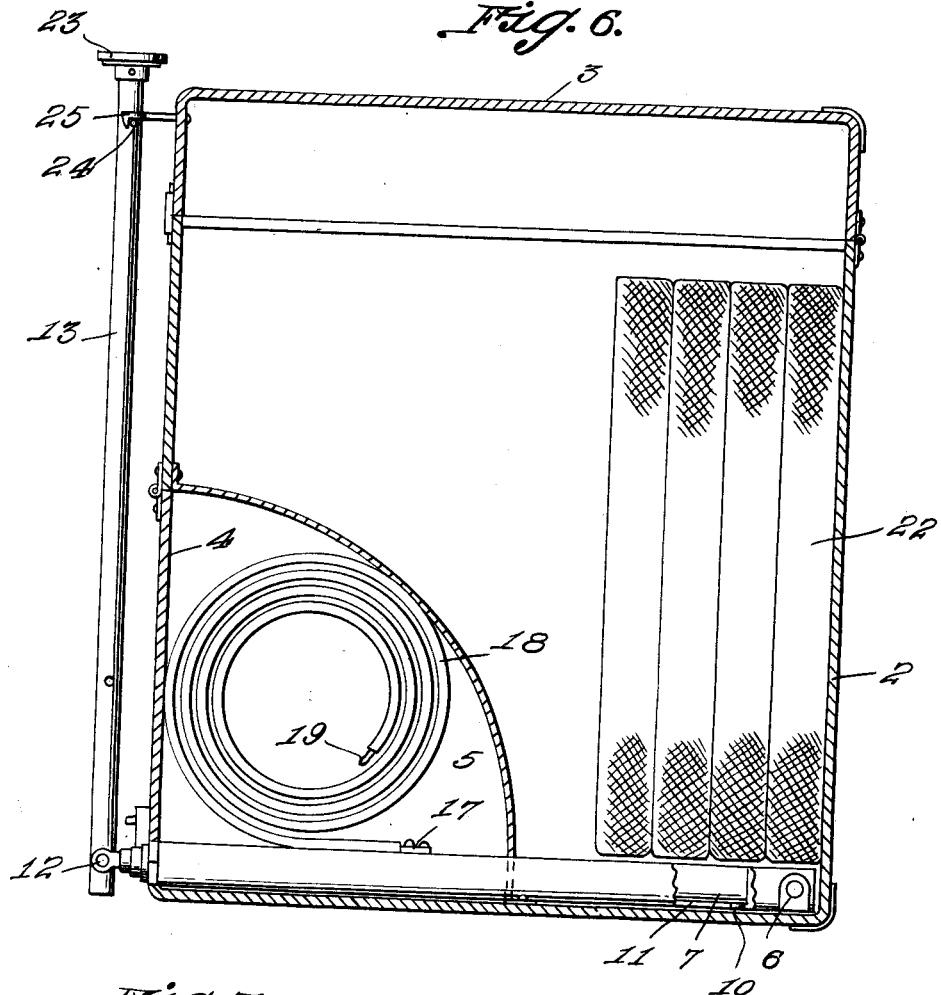
Fig. 7.　　　Fig. 8.
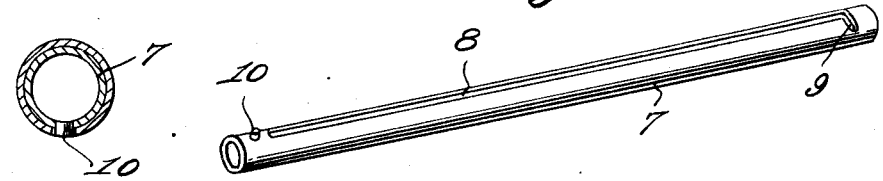
Fig. 9.
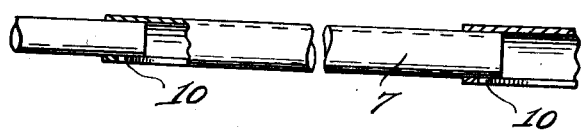
C. R. Spalding
INVENTOR
BY Victor J. Evans
ATTORNEY Patented Oct. 29, 1929

1,733,916

UNITED STATES PATENT OFFICE

CHARLES R. SPALDING, OF SAN FRANCISCO, CALIFORNIA

COMBINED TRUNK AND BED

Application filed November 19, 1926. Serial No. 149,459.

An object of this invention is the provision of a combined trunk and bed for automobiles.

A further object is the provision of a device of this character in which a trunk is secured on the back of an automobile in the usual manner, and which provides a housing for a telescopic bedstead as well as for the spring and mattress therefor, so that the bed, when not in use is effectively housed and protected, the construction being such that the bed may be readily brought to operative position and effectively supported in such position.

A still further object is the provision of a tourist's attachment for automobiles in the nature of a trunk secured on the rear of the automobile body and a bed which includes telescopic side members and a swingable end which is normally housed in the trunk, together with a spring for the bedstead which is also normally housed in a separate compartment in the trunk and which, when arranged over the bedstead when the latter is in set-up position, is engaged thereby in a manner to effectively stretch the springs, there being also transverse brace means for the sides of the bed which provide supports for the spring, together with a mattress made up of foldable sections which are readily stored in the trunk when not in use, the trunk further affording a space for other desired articles such as bed clothing and the like.

To the attainment of the foregoing and other objects which will present themselves as the nature of the invention is better understood, the improvement also resides in the combination, construction and operative association of parts, one satisfactory embodiment of which is disclosed by the accompanying drawings.

In the drawings:

Figure 1 is a side elevation of a sufficient portion of an automobile to illustrate the application of my improvement thereon, the bed being in set-up position.

Figure 2 is an end view thereof.

Figure 3 is a top plan view thereof.

Figure 4 is a detail elevation to illustrate the manner in which the legs of the foot board are retained in vertical position when the bed is set up.

Figure 5 is a perspective view of one of the spacing elements for the sides of the bed which also provides a support for the spring.

Figure 6 is a vertical transverse sectional view through the trunk with the elements constituting the improvement arranged therein and the foot board of the bed folded thereagainst.

Figure 7 is a sectional view approximately on the line 7—7 of Figure 9.

Figure 8 is a perspective view of one of the members comprising the telescopic side of the bed.

Figure 9 is an elevation with parts in section of one of the sides of the bed.

Secured in the usual manner on the back 1 of an automobile or like vehicle there is the trunk member 2 of the improvement. The trunk, in general, is of the ordinary construction, the same being provided with a hinged and normally closed top 3, but the said trunk in the present instance, has a hinged door 4 which normally closes an arcuate compartment 5 in the lower portion of the trunk. The door 4 is normally locked.

Fixed to the bottom at the rear of the trunk 2 there is a bracket or similar support 6 for the inner section 7 of the telescopic side rails of the bed. The sides of the bed are made up of any desired number of tubular members, one telescopically received in the other, and each of the sections, except the outer section is formed with a longitudinal slot 8 that has a transverse branch 9, adjacent to the inner end of the said section. Outward of the slot, and adjacent to the opposite end each section has a stud 10 to be received in the slot of the cooperating section. Thus when the sections are drawn outwardly through a suitable opening in the front at the lower corners of the trunk 2 and turned, the pin 10 of one of the sections will be received in the lateral passage 9 at the terminal of the slot in the cooperating section and in this manner the sides of the bed are effectively held from longitudinal movement. It should have been stated that the inner section of each side passes through a tubular guide member 11 in the bottom of the trunk. It should be stated that the element 7, which I have termed the inner section of the side of the bedstead is really in the nature of a guide tube, the same being, however, provided with a slot 11 for a pin on the inner section proper of the sides. The outer and reduced side sections have pivotally secured to the ends thereof, as at 12, the leg members 13 that support the side. The leg members project a suitable distance above the pivots 12 and are connected by upper and lower transverse members 14 and 15, respectively, and the members 14 and 15, together with the legs 13, form what may be termed the foot board of the bed. The outer side sections of the bed have pivoted thereto brace members 16 which engage the legs 13 and hold the bed in set-up position.

Having one end fixed, as at 17, either to the tubular members 7 or at any other suitable points in the housing 5, there is the spring 18 for the bed. The spring 18 is designed to be rolled in the housing when the bed is not in use, as disclosed by Figure 6 of the drawings. The spring has on its outer or free end hooks 19 and these hooks are designed to be brought over either the upper ends of the legs 13 or the upper cross bar of the foot board before the legs 13 are swung to their downward vertical position. By swinging the legs to such vertical and supporting position a tension will be exerted upon the spring 18 to draw the same taut.

To effectively support the spring and to likewise hold the sides of the bed in proper spaced relation I provide metal slats 20 that have hooked ends 21 for engagement with the said sides of the bed. These slats, of course, underlie the spring, and when not in use the slats are deposited in the compartment 5. Normally arranged in the trunk to the rear of the compartment 5 there is a mattress made up of any desired number of substantially rectangular sections 22. Flexible hinges may connect these sections and the mattress is drawn through the top of the trunk and arranged on the spring. By reference to Figure 6 of the drawings it will be seen that the trunk has ample space for the reception of bed clothing or for other articles required by the tourist and also by reference to this figure it will be seen that when the bed is collapsed in the trunk, the spring is wound and arranged in the compartment 5 and likewise the mattress received in the trunk. The foot board is swung on its pivot 12 upwardly against the outer side of the trunk. The legs of the foot board have their ends provided with widened foot portions 23 and inward thereof with pins 24 and these pins are designed to be engaged by spring latch means 25 carried on the outer flange of the top 3 for the trunk.

The improvement is of a simple construction, and may be readily attached to any ordinary type of automobiles or like vehicles.

While I have herein described only certain specific embodiments of my improvement I do not wish to limit myself to the exact construction and to the specific details as herein set forth, but hold myself entitled to resort to any practical modification falling within the scope of the invention as defined in the appended claims.

Having described the invention, I claim:—

1. In a device of the character described, a trunk adapted to be secured to a vehicle, means for securing and supporting one end of a foldable bed in said trunk, a hinged door for normally closing an arcuate compartment in said trunk at the lower portion thereof, said compartment being adapted to receive a bed spring in rolled position, legs for supporting the opposite end of the bed in extended position, spring latch means carried by said trunk, means on said legs for receiving the spring latch means for securing said bed in folded position and said trunk being adapted to receive a mattress in folded position.

2. In a device of the character described, a trunk adapted to be secured to a vehicle, a bracket arranged in the bottom of said trunk for securing one end of a foldable bed in said trunk, said bottom being adapted to support said bed in folded position and one end thereof in extended position, a hinged door for normally closing an arcuate compartment arranged adjacent the front of said trunk at the lower portion thereof, said compartment being adapted to receive a bed spring in rolled position, legs for supporting the opposite end of the bed in extended position, spring latch means extending outwardly from the top of said trunk and rearwardly therefrom, means on said legs for receiving said spring latch means for securing said bed in folded position and said trunk being adapted to receive a mattress in folded position to the rear of the arcuate compartment.

In testimony whereof I affix my signature.

CHARLES R. SPALDING.